United States Patent [19]
Li et al.

[11] Patent Number: 5,977,255
[45] Date of Patent: Nov. 2, 1999

[54] GLYCIDOXY-FUNCTIONAL POLYMER CURED WITH AMINE-FUNCTIONAL ORGANOSILICON COMPOUND

[75] Inventors: Irene Q. Li; Toshio Suzuki, both of Midland, Mich.

[73] Assignee: Dow Corning Corporation, Midland, Mich.

[21] Appl. No.: 08/944,576

[22] Filed: Oct. 6, 1997

[51] Int. Cl.$^6$ .................................................. C08F 290/02
[52] U.S. Cl. ...................................... 525/102; 106/287.11
[58] Field of Search ........................ 525/102; 106/287.11

[56] References Cited

U.S. PATENT DOCUMENTS

| | | |
|---|---|---|
| 4,250,074 | 2/1981 | Foscante et al. |
| 5,225,484 | 7/1993 | Shiobara et al. .................. 525/101 |
| 5,421,866 | 6/1995 | Stark-kasley et al. ...................... 106/2 |

FOREIGN PATENT DOCUMENTS

| | | |
|---|---|---|
| 528324 | 12/1976 | Russian Federation . |
| WO 96/16109 | 5/1996 | WIPO . |

OTHER PUBLICATIONS

Serier et al., "Modeling Interphase in composite Materials," pp. 85–90.
Jayaraman et al., "Epoxy and Hydroxy Functional Polyolefin Macromonomers," pp. 1543–1552.
Ivan et al., "Epoxy Functional Polyisobutylene," pp. 89–104.
Serier et al., "Aminosilane–Epoxy Reactions," pp. 209–218.
Sorokin et al., "Epoxy Cure," pp. 24–28.
Kochnova et al., "Curing of Epoxy Oligomers," pp. 24–27.

*Primary Examiner*—James J. Siedleck
*Assistant Examiner*—Caixia Lu-Rutt
*Attorney, Agent, or Firm*—Alex Weitz

[57] ABSTRACT

The present invention relates to a method for curing a hydrocarbon polymer having at least 2 glycidoxy groups in its molecule, said method comprising reacting the hydrocarbon polymer with a curing amount of an organosilicon compound having at least 2 nitrogen-bonded hydrogen groups as well as at least one silicon-bonded group selected from —R or —OR in its molecule, wherein R is selected from alkyl radicals having 8 to 18 carbon atoms or alkenyl radicals having 8 to 18 carbon atoms.

20 Claims, No Drawings

5,977,255

GLYCIDOXY-FUNCTIONAL POLYMER CURED WITH AMINE-FUNCTIONAL ORGANOSILICON COMPOUND

FIELD OF THE INVENTION

The present invention relates to a method of curing epoxy-functional hydrocarbon polymers. More specifically, the present invention deals with a new curing agent for glycidoxy-functional hydrocarbon polymers, particularly polyisobutylene, said agent being an amine-containing organosilicon compound which has at least one silicon-bonded $C_8$ to $C_{16}$ alkyl or alkoxy chain in its molecule.

BACKGROUND OF THE INVENTION

Various epoxy-functional polymers are well known in the art. These resins can be cured with an organic amine, such as diethylenetriamine, to form insoluble resins (for example, see the article by Ivan and Kennedy in *Journal of polymer Science: Part A: Polymer Chemistry*, Vol.28, 89–104 (1990)). Further, certain amine-functional silanes, such as γ-aminopropyltriethoxysilane, have been used to cure epoxy systems such as the glycidyl ether of bisphenol A (Serier et al. in *Makromol. Chem., Macromol. Symp.* 25, 85–90 (1989)). U.S. Pat. No. 4,250,074 to Fosconte et al. additionally discloses interpenetrating networks comprising epoxy polymer and polysiloxane prepared by reacting an organic amine and/or an amine-functional alkoxysilanes, having six or fewer carbon atoms in its alkoxy group, with an epoxy resin.

However, when such organic amines or amine-functional silanes are used to cure certain polymers, such as epoxy-functional polyisobutylene, it has been observed that the crosslinking process is quite slow, especially at low temperatures. In these systems, a long curing time is generally required and the resulting cured materials often have poor mechanical properties and tacky surfaces. Such protracted cure time is generally not acceptable in commercial applications and improved cure agents for the epoxy-functional systems are desired.

SUMMARY OF THE INVENTION

It has now been discovered that certain epoxy-functional polymers can be cured more efficiently (i.e., reduced cure time and/or temperature) when the above mentioned organic amine cure agents are replaced, at least in part, with an amine-containing organosilicon compound which has at least one silicon-bonded —R or —OR group having 8 to 18 carbon atoms in its molecule. Surprisingly, only polymeric systems wherein the epoxy group is a glycidoxy moiety benefit from the use of the amine-containing organosilicon curing agent of the invention. Additionally, the curing agents according to the present invention have reduced volatility relative to conventional organic amines and are therefore processable at higher temperatures with less risk of inhalation exposure.

The present invention, therefore, relates to a method for curing a hydrocarbon polymer (A) having at least 2 glycidoxy groups in its molecule, said method comprising reacting the hydrocarbon polymer with a curing amount of an organosilicon compound (B) having at least 2 nitrogen-bonded hydrogen groups, as well as at least one silicon-bonded group selected from the group consisting of —R and —OR, in its molecule, wherein R is an alkyl or alkenyl group having 8 to 18 carbon atoms.

The invention further relates to the curable composition formed by mixing the hydrocarbon polymer with a curing amount of the above mentioned organosilicon compound, as well as the cured product resulting from the reaction of these two components. These cured products have good mechanical properties and solvent resistance.

DETAILED DESCRIPTION OF THE INVENTION

Hydrocarbon polymer (A) of the present invention has at least two carbon-bonded glycidoxy groups of the formula

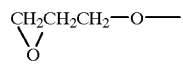

in its molecule. This glycidoxy group can be disposed either along the chain, at a chain terminus, or any combination thereof. Further, as used herein, the term "polymer" is generic to polymers, oligomers and interpolymers, all of which are within the scope of the instant invention. Preferably, this polymer has a linear structure wherein the glycidoxy functionality resides at the chain terminals. Polymer (A) may be selected from the various known linear or branched hydrocarbon polymers and interpolymers which incorporate repeat units such as ethylene, propylene, butylene, isobutylene, styrene, α-methylstyrene, p-methylstyrene and poly(α-olefin), inter alia.

A particularly preferred system is a polymer or interpolymer wherein at least about 50 mole percent, preferably at least 80 mole percent, of the hydrocarbon repeat units are isobutylene repeat units of the following structure

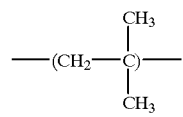

In such a system, one or more hydrocarbon monomers, such as isomers of butylene, styrene, derivatives of styrene, isoprene and butadiene, may be copolymerized with the isobutylene, the preferred co-monomer being selected from 1-butene, α-methylstyrene or isoprene. Most preferably, the polymer is a polyisobutylene (PIB) homopolymer which is terminated with a glycidoxy group at each end (i.e., a telechelic homopolymer).

The above mentioned hydrocarbon polymer can be prepared by, e.g., reacting a corresponding polymer which contains, or is modified to contain, at least two carbon-bonded silanol groups (i.e., ≡C—SiOH) with a glycidoxy-functional alkoxysilane, such as 3-glycidoxypropyldimethylmethoxysilane. This reaction is typically carried out by refluxing an organic solvent solution of the above named ingredients in the presence of a catalyst, such as an organotitanate.

The above mentioned silanol-functional hydrocarbon polymers are known in the art. For example, Japanese patent publication 70-53882 to Kanegafuchi discloses the hydrosilation of an allyl-functional PIB with an SiH-functional cyclic polysiloxane, followed by hydrolysis in the presence of a palladium catalyst.

Alternatively, the silanol-functional polymer can be prepared by first hydrosilating the corresponding allyl- or vinyl-functional polymer with a silane having both a silicon-bonded hydrogen and a hydrolyzable group in its molecule, such as dimethylchlorosilane, followed by hydrolysis of the resulting hydrolyzable group-containing polymer. The first of these reactions is catalyzed by a hydrosilation catalyst, such as platinum on carbon, chloroplatinic acid or a platinum complex, as well known in the art. Typically, the first reaction is carried out either neat or, preferably, in an organic solvent solution at a temperature of about 0 to 250° C., preferably about 20 to 1 50° C., most preferably at 40 to 100° C. When the hydrolyzable group is chlorine, the second (hydrolysis) reaction is generally carried out at about 0 to 60° C., preferably in the presence of a base such as sodium bicarbonate, the latter being used to neutralize the hydrochloric acid generated.

In another approach to the preparation of the glycidoxy-functional polymer (A), an allyl- or vinyl-functional polymer is first hydrosilated with a siloxane having two SiH-groups, such as tetramethyldisiloxane, to produce the corresponding SiH-functional polymer. The latter, in turn, is further reacted with an unsaturated glycidoxy compound, such as allyl glycidyl ether, using a hydrosilation catalyst.

Component (B) of the present invention is an amine-functional organosilicon compound, such as a silane or siloxane, and serves as the crosslinking agent for polymer (A). This organosilicon compound contains at least two nitrogen-bonded hydrogens in its molecule. Further, this component must also contain, on average, at least one silicon-bonded —R group or —OR group in its molecule, wherein R represents an alkyl or alkenyl group having 8 to 18 carbon atoms. In component (B), the amine functionality is separated from the silicon atom(s) by a divalent organic connecting group which provides a separation of at least one carbon atom between the nitrogen and silicon atoms thereof. Thus, this connecting group contains at least 1 carbon atom, but its nature is otherwise not critical to the invention provided that it does not interfere with the crosslinking reaction between components (A) and (B), described infra. It has been found that, when the number of carbon atoms in R is less than about 8, the cure rate of the instant compositions is reduced. On the other hand, when this number is greater than about 18, the cure agent becomes too viscous to handle easily. Moreover, the high molecular weight associated with such a large alkyl or alkenyl group requires the use of considerably more cure agent; this results in an uneconomical formulation.

Organosilicon compound (B) is a cure agent for polymer (A) and, for the purposes of the invention, must be compatible therewith. These components are considered to be compatible when a dispersion of a curing amount of component (B) in polymer (A), as described infra, is essentially stable for an extended period. Thus, it is contemplated that such a dispersion of cure agent (B) in polymer (A) which does not separate into two distinct phases within about one month at normal room temperature (i.e., about 25° C.) is stable.

It is also contemplated that further optional components may be added to the instant curable compositions, as desired. For example, fillers such as silica, carbon black, calcium carbonate, titanium dioxide, clay, alumina, ground quartz and talc, among others, can be incorporated, typically at a level of about 1 to 200 parts by weight for each 100 parts by weight of the combination of (A) plus (B). Other suitable optional components include, but are not limited to, pigments, viscosity modifiers, antioxidants, stabilizers, catalysts, adhesion promoters and flame retardants, inter alia.

In order to prepare the instant compositions, components (A) and (B) are thoroughly blended, whereupon the resulting mixture can then be cured at elevated temperatures, for example from about 20 to about 300° C., preferably about 60 to about 120° C.

The quantity of component (B) that is used is at least a curing amount. Thus, this quantity is at least the amount of (B) which will crosslink component (A) such that the resulting cured product is a gel, an elastomer or a solid plastic which is insoluble in a good (i.e. strong) solvent for polymer (A). Typically, the amount of (B) is selected such that the molar ratio of the total nitrogen-bonded hydrogen content of the amine groups of (B) to the total glycidoxy functionality of polymer (A) is about 1:1 to about 5:1. Preferably, this molar ratio is about 1:1 to about 3:1. In calculating this molar ratio, each amine hydrogen, whether primary or secondary, is considered reactive with respect to the glycidoxy functionality of (A) (i.e., each mole of —$NH_2$ contributes two moles of amine hydrogen while each mole of =NH contributes only one mole of amine hydrogen). Those skilled in the art will, of course, appreciate that either component (A) or component (B), or both, must have a functionality greater than 2 if polymer (A) is to be cured (i.e., the sum of these functionalities must be greater than 4 on average). It is further contemplated that conventional organic amines can be used in conjunction with component (B) provided they are compatible therewith and otherwise impart no untoward effects with respect to cure of polymer (A). When such organic amines are employed, the amount of (B) is, of course, adjusted to maintain the above discussed ratio of amine hydrogen to glycidoxy group.

Preferably, component (B) is a silane having a formula selected from (i) or (ii)

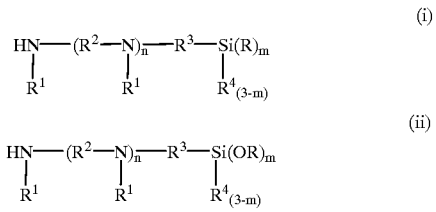

In the above formulas, R is as defined above and may be independently selected from alkyl radicals, such as octyl, decyl, dodecyl and octadecyl; or alkenyl radicals, such as octenyl, decenyl, dodecenyl and octadecenyl. It is preferred that R is independently selected from alkyl radicals having 8 to 18 carbon atoms, more preferably 8 to 16 carbon atoms. $R^1$ is independently selected from hydrogen or $R^4$ radicals and $R^4$ is independently selected from alkyl radicals having 1 to 4 carbon atoms. Preferably, $R^1$ is hydrogen and $R^4$ is methyl. Further, $R^2$ in formulas (i) and (ii) is a divalent hydrocarbon radical having 2 to 6 carbon atoms, such as ethylene, trimethylene, propylene, tetramethylene, isobutylene and hexamethylene, preferably ethylene. $R^3$ corresponds to the above mentioned divalent organic connecting group which provides a separation of at least one carbon atom between the nitrogen and silicon of formulas (i) and (ii). Preferably, $R^3$ is an alkylene group having 1 to 4 carbon atoms, such as methylene, ethylene, propylene, butylene and isobutylene. In the above formula, m is an integer having a value of 1 to 3 and n is an integer having a value of 0 to 10, preferably 0 or 1.

Examples of specific amine-containing groups which can be connected to the silicon atom of formulas (i) and (ii) include such structures as

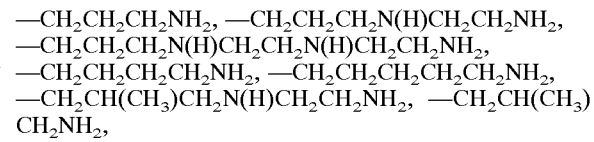

—CH$_2$CH$_2$CH$_2$SCH$_2$CH$_2$NH$_2$, —CH$_2$CH$_2$—C$_6$H$_4$—CH$_2$NH$_2$,
—CH$_2$CH$_2$CH$_2$O—C$_6$H$_4$—NH$_2$ and —CH$_2$CH$_2$CH$_2$N(H)(CH$_2$CH$_2$NH)$_n$CH$_2$CH$_2$NH$_2$,
inter alia, wherein n is as defined above and —C$_6$H$_4$— represents a phenylene group. Highly preferred organosilicon compounds of the invention are formed when one of the above amine-containing groups is attached to silicon in formula (i) or (ii), R is an alkyl radical group having 8 to 16 carbon atoms and m=3.

Silanes represented by formula (i) are well known in the art and do not require further description. Silanes represented by formula (ii) may be prepared by reacting the corresponding amine-functional lower alkoxysilane (e.g., a methoxysilane such as N-(2-aminoethyl)-3-aminopropyltrimethoxysilane) with an alcohol having 8 to 18 carbon atoms by heating these ingredients in an organic solvent in the presence of a catalyst, such as an organotitanate, this procedure also being known in the art.

It is further contemplated that a partial hydrolyzate of the silane represented by formula (ii) may also be used as component (B) provided that such a product still contains at least two amine hydrogens and at least one —OR group in its molecule and is compatible with (A), as described supra. Such partial hydrolyzates may be prepared by hydrolyzing silane (ii) with less than a stoichiometric amount of water required to hydrolyze all of the —OR groups, followed by condensation. Additionally, mixtures of the above silanes and partial hydrolyzates can be used as component (B) for the purposes of the present invention.

The curable compositions of the present invention find utility in the formulation of sealants, caulks, adhesives, coatings and paints, inter alia. These compositions can also be applied to various substrates, such as glass, metal, cloth, fabric, plastic, paper and masonry and cured thereon to produce the coated substrate.

EXAMPLES

The following examples are presented to further illustrate the method and composition of this invention, but are not to be construed as limiting the invention, which is delineated in the appended claims. All parts and percentages in the examples are on a weight basis and all measurements were obtained at 25° C. unless indicated to the contrary.

Preparation A

A hexadecanol modified ethylenediaminopropyltrimethoxysilane cure agent of the present invention was prepared as follows. An alkoxysilane consisting essentially of N-(2-aminoethyl)-3-aminopropyltrimethoxysilane (11.0 g, 0.05 mol), hexadecanol (36.3 g, 0.15 mol) and toluene (100 ml) were charged to a 250 ml flask equipped with magnetic stirrer, nitrogen inlet, thermometer, and Dean-Stark trap/condenser. An organotitanate catalyst (1% isopropanol/99% diisopropoxytitanium bis (ethylacetoacetate); 0.05 g) was added and the contents were heated to reflux as volatiles which accumulated in the trap were removed. Gas chromatography (GC) confirmed the evolution of methanol. After four hours, when no more methanol was being generated, the reaction mixture was cooled to room temperature. The remaining solvent was then removed on a rotary evaporator to produce a white solid consisting essentially of a silane having the predicted formula
H$_2$N—CH$_2$CH$_2$—N(H)—CH$_2$CH$_2$CH$_2$—Si(OC$_{16}$H$_{33}$)$_3$
The formation of the above structure was confirmed using $^{13}$C and $^1$H nuclear magnetic resonance (NMR).

Preparation B

A nonanol modified ethylenediaminopropyltrimethoxysilane was prepared in a procedure similar to Preparation A. In this case, 11.0 g, (0.05 mol) of the N-(2-aminoethyl)-3-aminopropyltrimethoxysilane, 28.0 g (0.15 mol) of nonanol and 100 ml of toluene were heated using 0.05 g of the above titanate catalyst. After four hours, when no more methanol was being generated, the reaction mixture was cooled to room temperature and the solvent removed, as described above, to provide a pale yellow liquid consisting essentially of a silane having the predicted formula
H$_2$N—CH$_2$CH$_2$—N(H)—CH$_2$CH$_2$CH$_2$—Si(OC$_9$H$_{19}$)$_3$
Again, the structure was confirmed using $^{13}$C and $^1$H NMR.

Preparation C

A 3,5,5-trimethyl-1-hexanol modified ethylenediaminopropyltrimethoxysilane was prepared in a procedure similar to Preparation A. In this case, 6.6 g, (0.03 mol) of the N-(2-aminoethyl)-3-aminopropyltrimethoxysilane, 20.0 g of 90% pure 3,5,5-trimethyl-1-hexanol (0.09 mole of the pure alcohol) and 50 ml of toluene were heated using 0.05 g of the above titanate catalyst. After four hours, when no more methanol was being generated, the reaction mixture was cooled to room temperature and the solvent removed, as described above, to provide a pale yellow liquid consisting essentially of a silane having the predicted formula
H$_2$N—CH$_2$CH$_2$—N(H)—CH$_2$CH$_2$CH$_2$—Si(OR)$_3$ in which R is —CH$_2$CH$_2$C(Me)H CH$_2$C(Me)$_2$CH$_3$ and Me hereinafter denotes a methyl radical. This structure was confirmed using $^{13}$C and $^1$H NMR.

Preparation D

A hexadecanol modified ethylenediaminopropyltrimethoxysilane cure agent of the present invention was prepared as follows. An alkoxysilane consisting essentially of N-(2-aminoethyl)-3-aminopropyltrimethoxysilane (11.0 g, 0.05 mole), hexadecanol (12.1 g, 0.05 mole) and toluene (100 ml) were charged to a 250 ml flask equipped with a magnetic stirrer, nitrogen inlet, thermometer, and Dean-Stark trap/condenser. The above described titanate catalyst (0.05 g) was added and the contents heated to reflux as volatiles which accumulated in the trap were removed. After 4 hours, the reaction mixture was cooled to room temperature and the remaining solvent was removed on a rotary evaporator to produce a light yellow liquid consisting essentially of a silane having the predicted formula
H$_2$N—CH$_2$CH$_2$—N(H)—CH$_2$CH$_2$CH$_2$—Si(OMe)$_2$(OR) in which R is —C$_{16}$H$_{33}$. This structure was confirmed using $^{13}$C and $^1$H NMR.

Preparation E

An epoxy-functional polyisobutylene was prepared as follows. Epion™ 200A, a telechelic allyl-functional polyisobutylene (PIB), was obtained from Kanegafuchi Chemical Industry, Co., Ltd. (Japan). This allyl-functional polyisobutylene had a number average molecular weight (M$_n$) of 5000, a weight average molecular weight (M$_w$) of 6600 and an average functionality of 1.9 allyl groups per molecule. The allyl-functional PIB was, in turn, converted to a telechelic epoxy-functional PIB (i.e., a PIB polymer having a carbon-bonded group of the formula

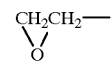

at its ends) according to methods described in the article by Ivan and Kennedy, cited supra.

Preparation F

The above described telechelic allyl-functional PIB was converted to a telechelic glycidoxy-functional PIB as follows. Tetramethyldisiloxane (67 g) and a neutralized complex of platinous chloride and divinyltetramethyldisiloxane prepared according to U.S. Pat. No. 5,175,325 to Brown et al. (4.2% toluene solution, 0.18 g) were placed in a 1000 ml 3-neck flask fitted with a condenser, nitrogen inlet, magnetic stirrer, thermometer and a dropping funnel. The contents were heated at 75° C. The above described allyl-terminated PIB (250 g) was dissolved in toluene (300 g) and placed in the dropping funnel. The allyl-PIB solution showed total disappearance of CH=$CH_2$ signals at 5.2 and 5.9 ppm, indicating that the reaction was complete. Excess reactants and solvent were removed under vacuum using a rotary evaporator to provide a yellow SiH-terminated PIB having $M_n$=6532 and $M_w$=8900.

The above Si-H-terminated PIB (230 g) was dissolved in 350 g of toluene and this solution was charged to a 1000 ml three-neck flask and the above described platinum complex (4.2% toluene solution, 0.28 g) was added. An addition funnel was charged with a solution of allyl glycidyl ether (12.7 g) in 30 g of toluene. The flask contents were heated to 80° C. and the allyl glycidyl ether solution was added dropwise. After the addition was complete, the contents were heated at 80° C. for 3 hours. The IR spectrum showed total disappearance of Si-H absorption signal indicating that the reaction was complete. Excess reactants and solvent were removed under vacuum using a rotary evaporator to provide a dark yellow telechelic glycidoxy-terminated polymer having $M_n$=8560.

COMPARATIVE EXAMPLES 1–6

One gram of the epoxy-functional PIB (Preparation E) was mixed with the type and amount of cure agent recited in the second and third columns, respectively, of Table 1 to provide compositions wherein the calculated molar ratio of NH groups to glycidoxy groups was 3:1. Each such composition was thoroughly mixed in an aluminum weighing dish and allowed to cure at the temperatures and times indicated in columns 4 and 5, respectively, of Table 1 (e.g., Comparative Example 1 was cured at 60° C. for 48 hours and then at 120° C. for 72 hours). After the curing procedure, each composition was touched to determine the degree of cure. The results of this determination are reported in the last column of Table 1, wherein the term "tacky" indicates that the surfaces of these comparative compositions, which also included two conventional organic amine cure agents, had not cured completely.

TABLE 1

| Comparative Example | Cure Agent | Cure Agent Amount (g) | Curing T(° C.) | Curing Time(h) | Surface |
|---|---|---|---|---|---|
| 1 | Preparation A | 0.19 | 60 + 120 | 48 + 72 | tacky |
| 2 | Preparation B | 0.18 | 60 + 120 | 48 + 72 | tacky |
| 3 | Preparation C | 0.20 | 60 + 120 | 48 + 72 | tacky |
| 4 | AEAPTMS | 0.08 | 60 + 120 | 48 + 120 | tacky |
| 5 | DETA | 0.02 | 60 + 120 | 48 + 120 | tacky |
| 6 | DADD | 0.05 | 60 + 120 | 48 + 120 | tacky |

AEAPTMS = N-(2-aminoethyl)-3-aminopropyltrimethoxysilane
DETA = Diethylenetriamine
DADD = 1,12-Diaminododecane From Table 1 it is seen that neither the conventional amines nor the amines of the invention resulted in a complete cure, even after extensive heating at 120° C.

EXAMPLES 7–12

One gram of the telechelic glycidoxy-functional PIB (Preparation F) was mixed with the type and amount of the cure agent recited in the second and third columns, respectively, of Table 2 to provide compositions wherein the calculated molar ratio of NH groups to glycidoxy groups was 3:1. Each such composition was mixed and allowed to cure at the temperatures and times indicated in columns 4 and 5, respectively, of Table 2, as described in connection with (Comparative) Examples 1–6. After curing, each composition was again evaluated as to degree of cure and this is reported in the last column of Table 2, wherein the term "dry" indicates that each composition of the invention was completely cured and did not have a tacky surface. Again, it was observed that compositions using N-(2-aminoethyl)-3-aminopropyltrimethoxysilane, diethylenetriamine or 1,12-diaminododecane as the cure agents resulted in tacky surfaces, an indication of incomplete cure.

TABLE 2

| Example | Cure Agent | Cure Agent Amount (g) | Curing T(° C.) | Curing Time(h) | Surface |
|---|---|---|---|---|---|
| Example 7 | Preparation A | 0.12 | 60 | 24 | dry |
| Example 8 | Preparation B | 0.12 | 60 | 30 | dry |
| Example 9 | Preparation C | 0.13 | 60 | 30 | dry |
| (Comparative) Example 10 | AEAPTMS | 0.05 | 60 + 120 | 48 + 24 | tacky |
| (Comparative) Example 11 | DETA | 0.01 | 60 + 120 | 48 + 48 | tacky |
| (Comparative) Example 12 | DADD | 0.04 | 60 + 120 | 48 + 72 | tacky |

AEAPTMS = N-(2-aminoethyl)-3-aminopropyltrimethoxysilane
DETA = Diethylenetriamine
DADD = 1,12-Diaminododecane From Table 2 it is seen that the organic amines and the N-(2-aminoethyl)-3-aminopropyltrimethoxysilane again did not result in a complete cure, as indicated by the tacky surfaces observed for these compositions even after additional heating at 120° C. To the contrary, the composition according to the present invention (Examples 7–9) were cured (dry surfaces) although exposed for a shorter period and at a lower temperature (60° C.).

EXAMPLES 13–14

One gram portions of Preparation E (Comparative Example 13) and Preparation F (Example 14) were mixed with the cure agent of Preparation D to provide compositions wherein the calculated molar ratio of NH groups to epoxy or glycidoxy groups was 3:1, respectively, as indicated in Table 3. These compositions were heated under the conditions shown in Table 3. It was again observed that the composition based on the epoxy-functional PIB remained a liquid or was tacky while that based on the glycidoxy-functional PIB cured to a dry film.

TABLE 3

| | Amount of Preparation D | Cure Temp. (° C.) | Cure time (hr) | Surface |
|---|---|---|---|---|
| (Comp.) Ex. 13 | 0.15 g | 60 | 24 | liquid * |
| " | | 120 | 72 | very tacky |
| Example 14 | 0.10 g | 60 | 24 | dry |

* total composition was liquid

That which is claimed is:

1. A method for curing a hydrocarbon polymer, said method comprising reacting (A) a hydrocarbon polymer having at least 2 glycidoxy groups in its molecule, with (B) an organosilicon compound having at least 2 nitrogen-bonded hydrogen groups and at least one silicon-bonded group selected from the group consisting of —R and —OR in its molecule, wherein R is selected from the group consisting of alkyl radicals having 8 to 18 carbon atoms and alkenyl radicals having 8 to 18 carbon atoms.

2. The method according to claim 1, wherein at least 50 mole percent of the repeat units of said hydrocarbon polymer (A) are isobutylene repeat units.

3. The method according to claim 2, wherein said hydrocarbon polymer (A) is a telechelic polyisobutylene homopolymer.

4. The method according to claim 1, wherein said organosilicon compound is selected from the group consisting of
(a) silanes having a formula selected from the group consisting of

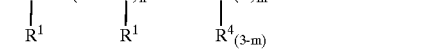

(b) partial hydrolyzates of (ii) and
(c) mixtures of said silanes and said partial hydrolyzates, wherein R is independently selected from the group consisting of alkyl radicals having 8 to 18 carbon atoms and alkenyl radicals having 8 to 18 carbon atoms, $R^1$ is independently selected from the group consisting of hydrogen and $R^4$ radicals, $R^4$ is independently selected from the group consisting of alkyl radicals having 1 to 4 carbon atoms, $R^2$ is a divalent hydrocarbon radical having 2 to 6 carbon atoms, $R^3$ is a divalent organic connecting group having at least 1 carbon atom, m is an integer having a value of 1 to 3 and n is an integer having a value of 0 to 10.

5. The method according to claim 4, wherein said organosilicon compound (B) is represented by the formula

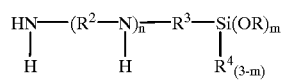

wherein R is independently selected from the group consisting of alkyl radicals having 8 to 18 carbon atoms and alkenyl radicals having 8 to 18 carbon atoms, $R^4$ is independently an alkyl radical having 1 to 4 carbon atoms, $R^2$ is an alkylene radical having 2 to 6 carbon atoms, $R^3$ is an alkylene group having 1 to 4 carbon atoms, m is an integer having a value of 1 to 3 and n is 0 or 1.

6. The method according to claim 5, wherein R is independently selected from alkyl radicals having 8 to 18 carbon atoms, $R^4$ is a methyl radical, $R^2$ is an ethylene radical, $R^3$ is an alkylene group having 1 to 4 carbon atoms, m is an integer having a value of 1 to 3 and n is 0 or 1.

7. The method according to claim 6, wherein at least 50 mole percent of the repeat units of said hydrocarbon polymer (A) are isobutylene repeat units.

8. The method according to claim 7, wherein said hydrocarbon polymer (A) is a telechelic polyisobutylene homopolymer.

9. A curable composition obtained by mixing:
(A) a hydrocarbon polymer having at least 2 glycidoxy groups in its molecule; and (B) a curing amount of an organosilicon compound having at least 2 nitrogen-bonded hydrogen groups as well as at least one silicon-bonded group selected from the group consisting of —R and —OR in its molecule, wherein R is selected from the group consisting of alkyl radicals having 8 to 18 carbon atoms and alkenyl radicals having 8 to 18 carbon atoms, with the proviso that said organosilicon compound (B) is compatible with said polymer (A).

10. The composition according to claim 9, wherein at least 50 mole percent of the repeat units of said hydrocarbon polymer (A) are isobutylene repeat units.

11. The composition according to claim 10, wherein said hydrocarbon polymer (A) is a telechelic polyisobutylene homopolymer.

12. The composition according to claim 9, wherein said organosilicon compound (B) is selected from the group consisting of
(a) silanes having a formula selected from the group consisting of

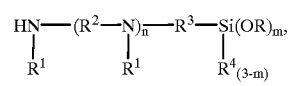

(b) partial hydrolyzates of (ii) and
(c) mixtures of said silanes and said partial hydrolyzates, wherein R is independently selected from the group consisting of alkyl radicals having 8 to 18 carbon atoms and alkenyl radicals having 8 to 18 carbon atoms, $R^1$ is independently selected from the group consisting of hydrogen and R4 radicals, $R^4$ is an alkyl radical having 1 to 4 carbon atoms, $R^2$ is a divalent hydrocarbon radical having 2 to 6 carbon atoms, $R^3$ is a divalent organic connecting group having at least 1 carbon atom, m is an integer having a value of 1 to 3 and n is an integer having a value of 0 to 10.

13. The composition according to claim 12, wherein said organosilicon compound (B) is represented by the formula

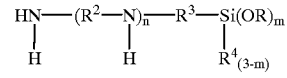

wherein R is independently selected from the group consisting of alkyl radicals having 8 to 18 carbon atoms and alkenyl radicals having 8 to 18 carbon atoms, R4 is independently an alkyl radical having 1 to 4 carbon atoms, $R^2$ is an alkylene radical having 2 to 6 carbon atoms, $R^3$ is an alkylene group having 1 to 4 carbon atoms, m is an integer having a value of 1 to 3 and n is 0 or 1.

14. The composition according to claim 13, wherein R is independently selected from alkyl radicals having 8 to 18 carbon atoms, $R^4$ is a methyl radical, $R^2$ is an ethylene radical, $R^3$ is an alkylene group having 3 to 4 carbon atoms, m is an integer having a value of 1 to 3 and n is 0 or 1.

15. The composition according to claim 14, wherein at least 50 mole percent of the repeat units of said hydrocarbon polymer (A) are isobutylene repeat units.

16. The product according to claim 15, wherein said hydrocarbon polymer (A) is a telechelic polyisobutylene homopolymer.

17. A product obtained by curing the composition according to claim 10.

18. A product obtained by curing the composition according to claim 11.

19. A product obtained by curing the composition according to claim 15.

20. A product obtained by curing the composition according to claim 16.

* * * * *